(12) United States Patent
Mazzarella

(10) Patent No.: US 7,200,408 B1
(45) Date of Patent: Apr. 3, 2007

(54) SELECTIVE BLOCKING IN A COMMUNICATION NETWORK

(75) Inventor: Nick J. Mazzarella, Woodridge, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/465,198

(22) Filed: Dec. 15, 1999

(51) Int. Cl.
*H04Q 7/20* (2006.01)
*H04M 15/00* (2006.01)

(52) U.S. Cl. ............. 455/453; 455/436; 455/445; 370/230; 370/237; 379/111; 379/112.04

(58) Field of Classification Search .......... 370/229, 370/230, 232, 233, 234, 237, 252, 236, 238, 370/242, 246, 220, 401, 328, 465, 352, 466; 379/133, 134, 111, 112.01, 221.01, 221.09; 455/445, 443, 428, 453, 560, 524, 525, 436
See application file for complete search history.

(56) References Cited

U.S. PATENT DOCUMENTS

| | | | | |
|---|---|---|---|---|
| 4,224,479 A * | 9/1980 | Crawford | .................... | 379/134 |
| 5,067,074 A * | 11/1991 | Farel et al. | .................. | 370/230 |
| 5,521,905 A * | 5/1996 | Oda et al. | .................... | 370/232 |
| 5,548,533 A * | 8/1996 | Gao et al. | .................... | 709/235 |
| 5,703,870 A * | 12/1997 | Murase | ........................ | 370/232 |
| 5,778,057 A * | 7/1998 | Atai | .......................... | 379/111 |
| 5,867,787 A * | 2/1999 | Vudali et al. | ................ | 455/445 |
| 5,898,672 A * | 4/1999 | Ginzboorg | .................. | 370/236 |
| 5,978,672 A * | 11/1999 | Hartmaier et al. | .......... | 455/413 |
| 6,011,780 A * | 1/2000 | Vaman et al. | ................ | 370/237 |
| 6,018,519 A * | 1/2000 | Ginzboorg | .................. | 370/236 |
| 6,101,393 A * | 8/2000 | Alperovich et al. | ........ | 455/466 |
| 6,131,029 A * | 10/2000 | Roberts | ....................... | 455/438 |
| 6,137,806 A * | 10/2000 | Martinez | .................... | 370/428 |
| 6,259,776 B1 * | 7/2001 | Hunt | .......................... | 370/229 |
| 6,266,402 B1 * | 7/2001 | Ferguson et al. | ........... | 379/134 |
| 6,317,601 B1 * | 11/2001 | Agarwal et al. | ............. | 455/453 |
| 6,405,045 B1 * | 6/2002 | Choi et al. | .................. | 455/453 |
| 6,526,282 B1 * | 2/2003 | Kadoshima et al. | ........ | 455/453 |
| 6,741,694 B1 * | 5/2004 | Smith et al. | ........... | 379/221.08 |
| 6,870,922 B1 * | 3/2005 | Snape | ................... | 379/221.12 |

* cited by examiner

*Primary Examiner*—Charles N. Appiah

(57) ABSTRACT

A selective blocking request is sent from a requesting network element to an SCF (system control function component), where the request identifies a targeted network element. The SCF may then block communications from the targeted network element to the requesting network element, or it may send an ACG (automatic code gapping) message to the targeted network element requesting it to stop sending communications to the requesting network element. This technique offers the advantage of allowing an overloaded network element to reduce its workload while informing other components of the network that messages from a targeted network component will not be accepted by the overloaded network element.

9 Claims, 6 Drawing Sheets

SELECTIVE BLOCKING IN A COMMUNICATION NETWORK

BACKGROUND OF THE INVENTION

1. Field of the Invention

The present invention relates to communication systems; more particularly, controlling traffic in communication systems.

2. Brief Description of the Related Art

FIG. 1 illustrates a typical communication system. The communication system consists of network elements or components 10, 12, 14 and 16. The network elements (NEs) each communicate with a central system control function component (SCF) 18. Central system control function 18 coordinates traffic between the network elements and may be, for example, a network signaling center or a traffic routing node. In the case of a wireless communication system, the network elements may be, for example, mobile switching centers (MSCs) or base stations. Additionally, wireless communication systems include components such as home location register (HLR) 20 and wireless network point (WNP) 22. The home location register is used, for example, to authenticate the identity of mobiles requesting access to the network, and wireless network point 22 may be a wireless base station or an access point in a wireless local area network.

The SCF controls its workload by controlling the communications between it and each of the network elements. For example, if SCF 18 is overloaded by communications from a particular network element, such as network element 12, it may send an ACG (automatic code gapping) message or block command to network element 12. The AGC message commands network element 12 to stop sending messages to SCF 18 for a specified length of time. The ACG message is known as a automatic code gapping message in networks using the ANSI-41 communication protocol. In addition to the SCF becoming overloaded, it is possible for a network element such as network element 16 to become overloaded. In this case, network element 16 simply stops accepting communications from the SCF in order to reduce its workload. Unfortunately, SCF 18 and any network element or component trying to communicate with network element 16, is not informed of the overload condition at network element 16. This results in network element 16 ignoring messages sent from other elements or components within the network while the elements or components sending the messages are operating under the assumption that network element 16 is receiving and responding to messages sent.

SUMMARY OF THE INVENTION

The present invention solves the aforementioned problems by providing a selective blocking request that is sent from a requesting network element to an SCF (system control function component), where the request identifies a targeted network element. The SCF may then block communications from the targeted network element to the requesting network element, or it may send an ACG (automatic code gapping) message to the targeted network element requesting it to stop sending communications to the requesting network element. This technique offers the advantage of allowing an overloaded network element to reduce its workload while informing other components of the network that messages from an identified network component will not be accepted by the overloaded network element.

DETAILED DESCRIPTION

Figure 1:
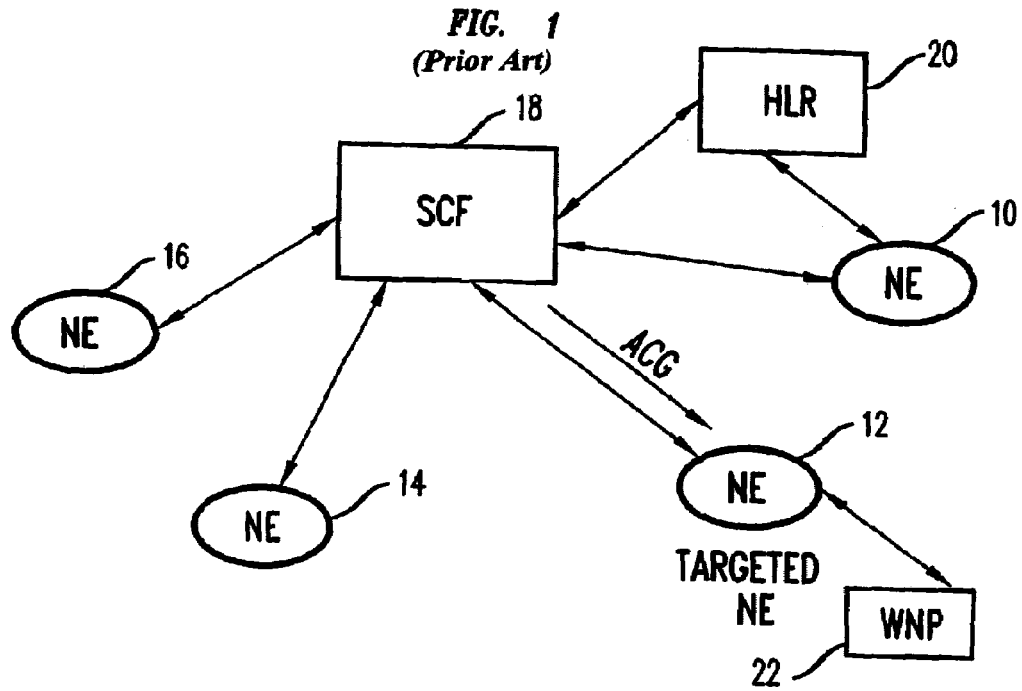
FIG. 1 illustrates a communication network.
Figure 2:
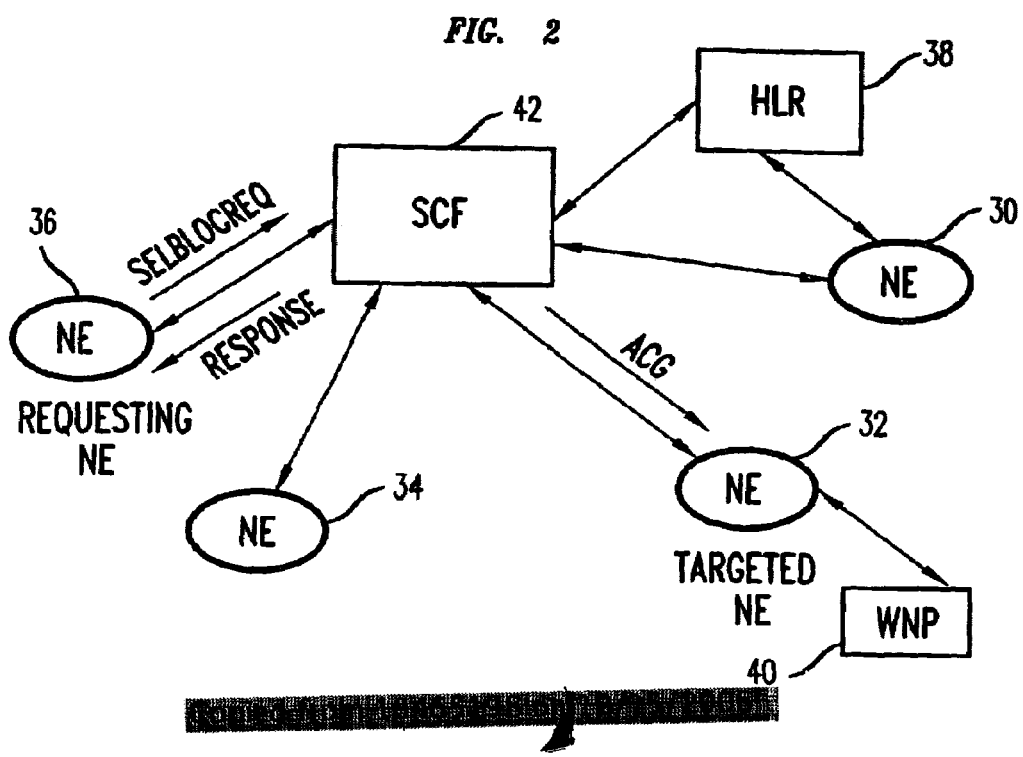
FIG. 2 illustrates a communication network using a selective blocking request.

FIG. 2 illustrates a communication network such as a wireless communication network having network components such as network elements (NEs) 30, 32, 34 and 36. The network elements may be, for example, mobile switching centers or base stations. The network also includes components such as home location register (HLR) 38, wireless network point (WPN) 40 and system control function component (SCF) 42. Wireless network point 40 may be, for example, a wireless base station or an access point on a wireless local area network. When network element 36 (the requesting NE) becomes overloaded it may send a selective blocking request to SCF 42. The selective blocking request specifies which of the network elements (the targeted NE) should be blocked from sending messages to network element 36. The request may also include the duration of time over which the selective block should remain in effect, and it may also include intervals during the blocking period when a message may be accepted from the blocked or targeted network element. In response to receiving the selective blocking request, SCF 42 sends a response message back to requesting network element 36 indicating whether the request is accepted or rejected. If the blocking request is accepted, SCF 42 will block communications from the targeted network element, or it will send an ACG (automatic code gapping) message to the targeted element informing the targeted element not to send messages to the requesting network element.

Figure 3:
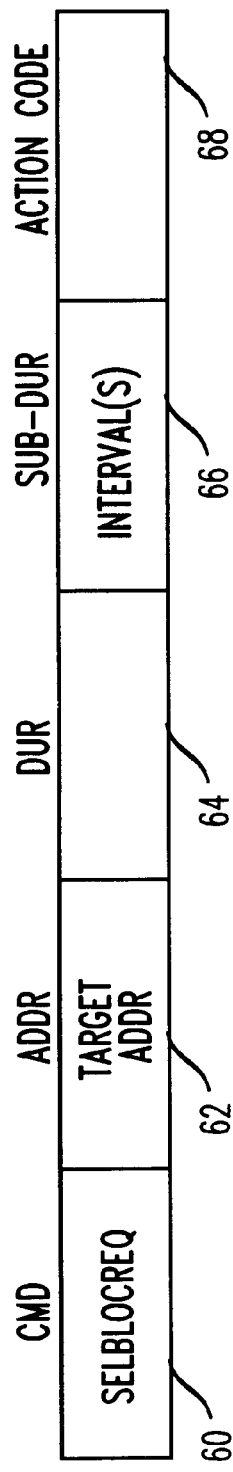
FIG. 3 illustrates the format of a selective blocking request.

FIG. 3 illustrates the format of the selective blocking request. Command field 60 identifies the message as a selective blocking request. Address field 62 identifies the address of the targeted element; the targeted element is the element or network component from which requesting element addressed messages should be blocked. Duration field 64 indicates the duration of time or blocking period over which messages from the targeted element should be blocked. Subduration field 66 indicates the intervals during the duration time or blocking period when a message will be accepted from the targeted network element. Typically, one message is accepted per interval specified by the subduration field. Action field 68 provides a command to the targeted network element indicating, for example, where messages that are blocked should be sent as an alternative to the requesting network element. For example, the messages may be sent to a network element that has a load sharing function with the requesting network element. It should be noted that the command provided in action code field 68 may be modified by SCF 42.

Figure 4:
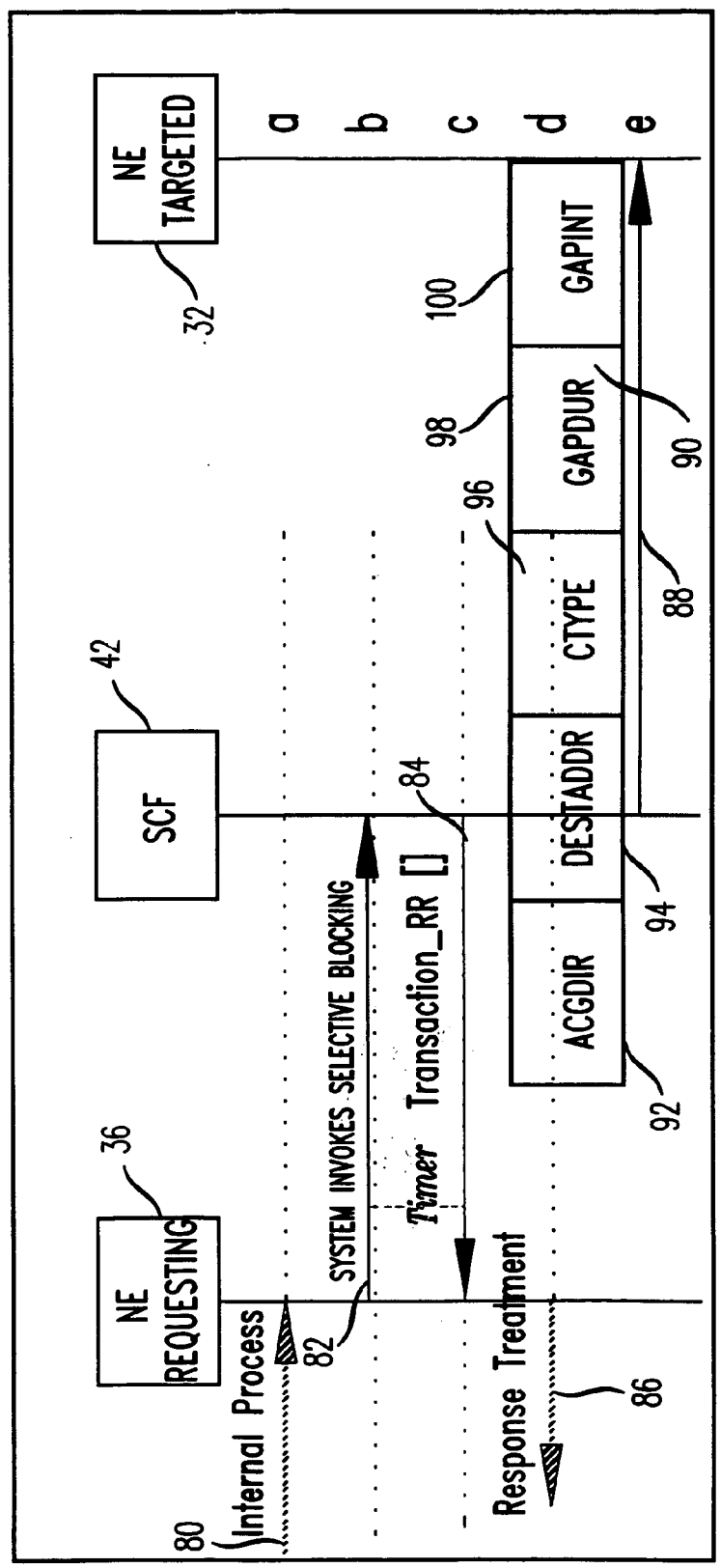
FIG. 4 illustrates the control flow of a selective blocking request and the format of an ACG message.

FIG. 4 illustrates the control flow associated with the selective blocking request. Initially in step 80, requesting network element 36 determines through an internal process, such as a load monitoring process, that traffic or messages from a specific origination address such as target network element 32 should be blocked. In step 82, requesting network element 36 sends a selective blocking request to SCF 42. The request is a form such as the format discussed with regard to FIG. 3. In step 84, SCF 42 evaluates the effect of the blocking request on the communication network, and based on that evaluation, either accepts or rejects the response. The accept or reject message is then sent to requesting network element 36. In step 86, requesting network element 36 then responds based on whether the message from SCF 42 was an accept or reject. For example, if the response was an accept, network element 36 will reject messages received from the targeted network element, and if the response from SCF 42 was a reject, network element 36 will continue to accept messages from targeted network element 32. In step 88, if SCF 42 accepted the selective blocking request, ACG message 90 is sent to targeted network element 32.

The ACG message is formatted using several fields. ACGDIR field 92 identifies the message as an ACG message. DESTADDR field 94 identifies the address of the requesting network element 36. This provides target network element 32 with the address to which messages should not be sent. CTYPE field 96 indicates whether the ACG message is originating from a requesting network element or SCF 42. GAPDUR field 98 indicates the length of time during which the block is to remain in force. GAPINT field 100 specifies the minimum amount of time the targeted network element must wait before sending another message to the requesting network element. This is based on the subduration field 66 of the original selective blocking request transmitted by the requesting network element 36. Field 100 may specify the length of time to the beginning of the next interval during which a communication will be accepted, or it may simply specify the times and durations of each of the intervals during which a message may be sent to the requesting network element.

Figure 5:
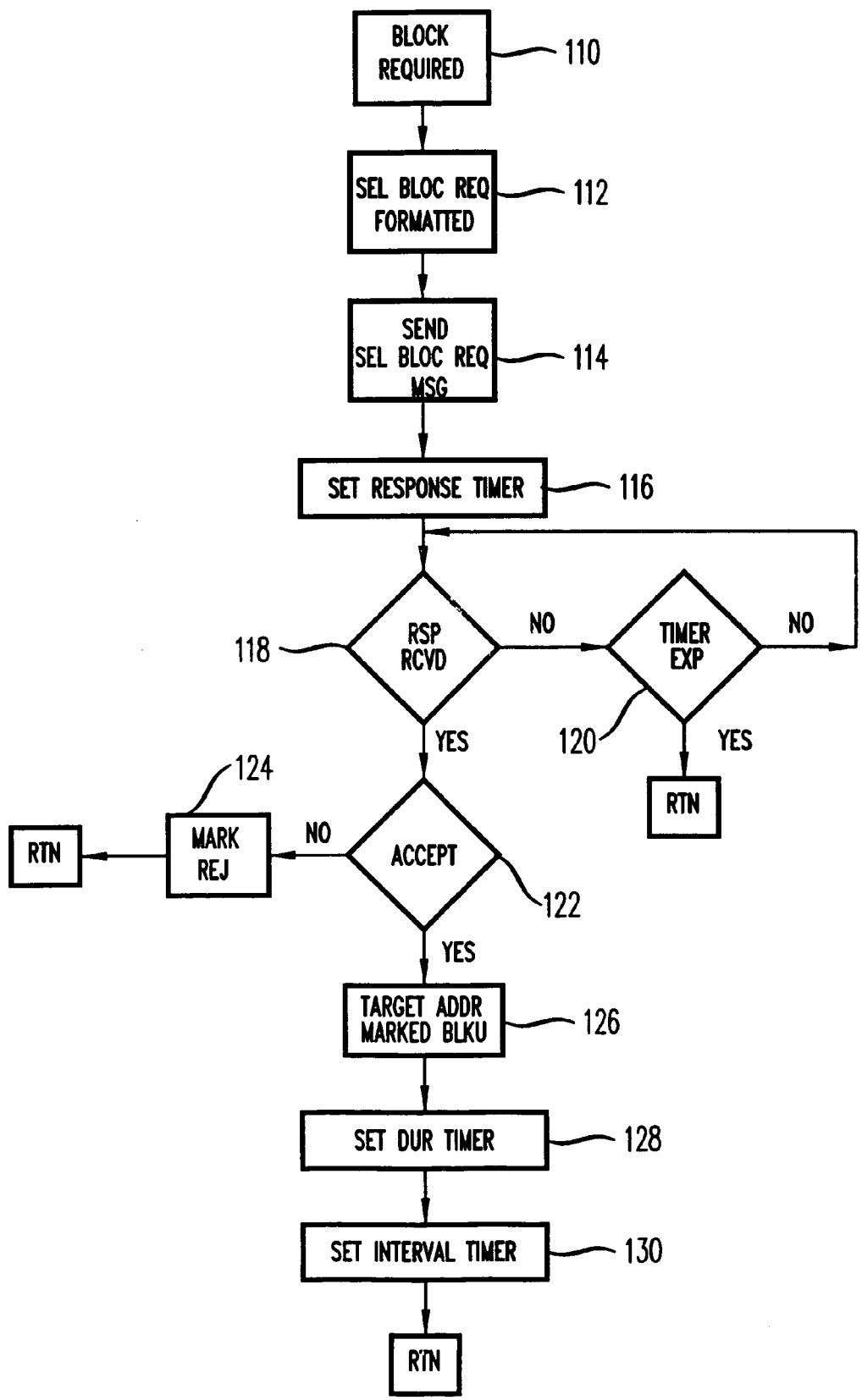
FIG. 5 illustrates a flow diagram of a network element sending a blocking request to an SCF.

FIG. 5 illustrates a flow diagram for a network element sending a selective blocking request to an SCF. In step 110, the network element determines that a blocking request is required. This determination may be based, for example, on an overload condition at the network element. In step 112, the selective blocking request message is formatted. The formatting includes providing the address of the targeted network element, the duration of the blocking period, and identifying the intervals during the blocking period when a message will be accepted from a targeted element. In some cases, the selective blocking request includes a suggested action to be taken when messages are not being sent to the requesting network element. These actions may include, for example, sending the messages to a network element that is used to loadshare with the requesting network element. In step 114, the selective blocking request message is sent to SCF 42. In step 116, a response timer is set. In step 118, it is determined whether a response message is received from SCF 42. If no response is received, step 120 is executed to determine if the timer has expired. If the timer has expired, a return is executed and the network element continues to perform its normal tasks which may include identifying a different network element for selective blocking. If in step 120, it is determined that the time has not expired, step 118 is once again executed to determine if a response has been received. If in step 118, it is determined that a response has been received, step 122 is executed where it is determined whether the response is an accept or reject. If the response was a reject, step 124 is executed where the request is marked as a reject and the requesting network element returns to its normal processing which may include determining whether a selective blocking request should be sent identifying the same or different targeted network element. If in step 122, it is determined that an accept response is received from the SCF, the targeted address is marked as blocked in step 126. In steps 128 and 130, the duration timer and the interval timers are set, respectively. The network element then returns to its normal processing; however, it now blocks messages from the targeted network element. A further discussion of this blocking function will be carried out with regard to FIG. 7.

Figure 6:
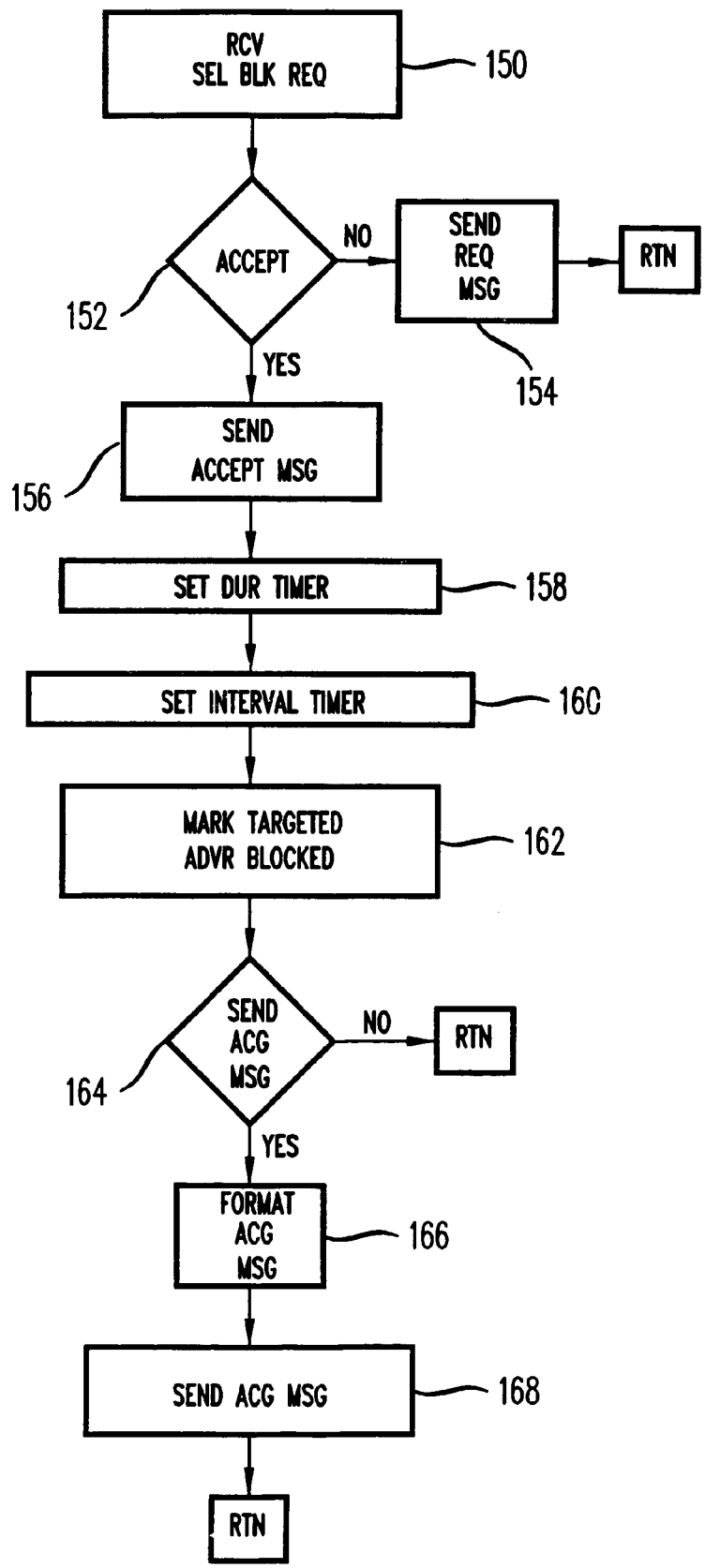
FIG. 6 illustrates the flow diagram followed by an SCF when it receives a selective blocking request from a network element.

FIG. 6 illustrates a flow diagram executed by the SCF when it receives its selective blocking request from requesting network element 36. In step 150, the selective blocking request is received. In step 152, the SCF determines whether or not to accept the request. This determination is made, for example, based on the overall effect on the network that will result from blocking communication between the targeted network element and the requesting network element. If the SCF determines that the blocking request is to be rejected, step 154 is executed where a rejection message is sent to the requesting network element and then the SCF returns to its normal functioning. If in step 152, it is determined that the blocking request will be accepted, an accept message is sent to the requesting network element in step 156. In step 158, the duration timer is set based on the duration of the blocking period as specified in field 64 of the selective block message. In step 160, interval timer(s) are set to identify the interval or intervals specified in subduration field 66 of the selective blocking request message. These intervals are the times when a message may be transferred from the targeted network element to the requesting network element. Typically these intervals are limited to one message; however, more than one message may be permitted. In step 162, the address of the targeted network element is marked as blocked. In step 164, SCF 42 determines whether to send an ACG message or blocking command to the targeted network element. If the SCF is underloaded, it may perform the blocking function at the SCF and not send an ACG message to the targeted network element. If the SCF determines that its present workload does not permit performing the blocking function at the SCF, step 166 is performed where an ACG message is formatted. As discussed with regard to FIG. 4, the ACG message identifies the duration, the requesting network element, the blocking duration, intervals when a message may be sent, and an alternative action to be taken in lieu of sending a message to a requesting network element. In step 168, the ACG message is sent to the targeted network element and then the SCF returns to its normal functioning.

Figure 7:
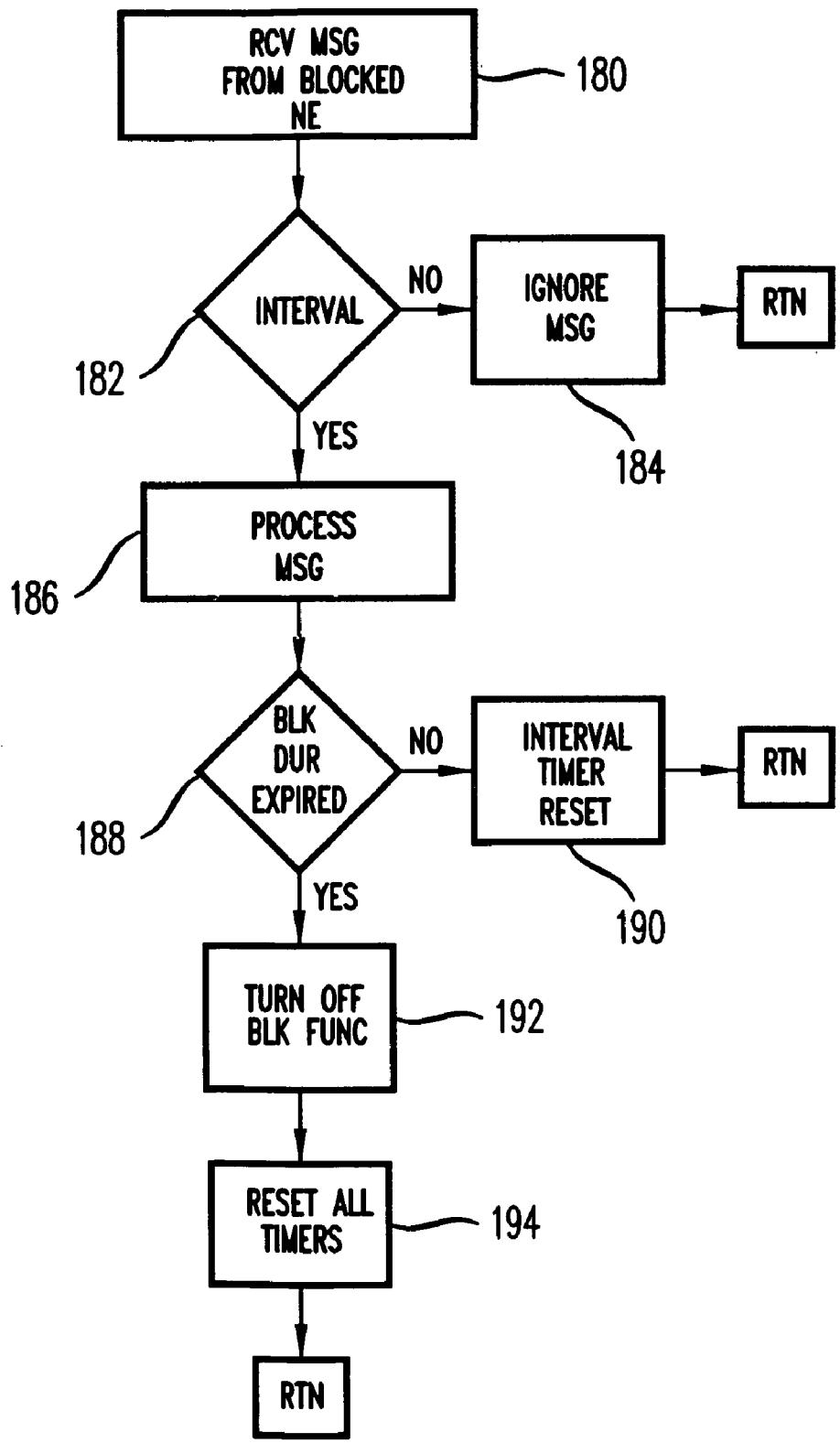
FIG. 7 illustrates a flow diagram for a network element when it receives a message during a blockout period.

FIG. 7 illustrates the actions taken by a requesting network element if it receives a message from a targeted network element during the blocking period. In step 180, the requesting network element receives a message from the targeted network element. In step 182, the requesting network element determines whether this is an interval during which a message will be accepted. If it is determined that this is not an interval during which a message will be accepted, in step 184 the message is ignored and then the network element returns to its normal processing. If in step 182, it is determined that this is an interval during which a message will be accepted, in step 186 the message is processed. In step 188, it is determined whether the blocking duration has expired. If the duration has not expired, in step 190 the interval timer is reset so that the requesting network element may determine the beginning and end of the next interval during which a message will be accepted. If in step 188, it is determined that the blocking duration has expired, step 192 is executed where the blocking function is deactivated and then in step 194, the block duration timer and interval timers are reset. The requesting network element then returns to its normal functioning.

Figure 8:
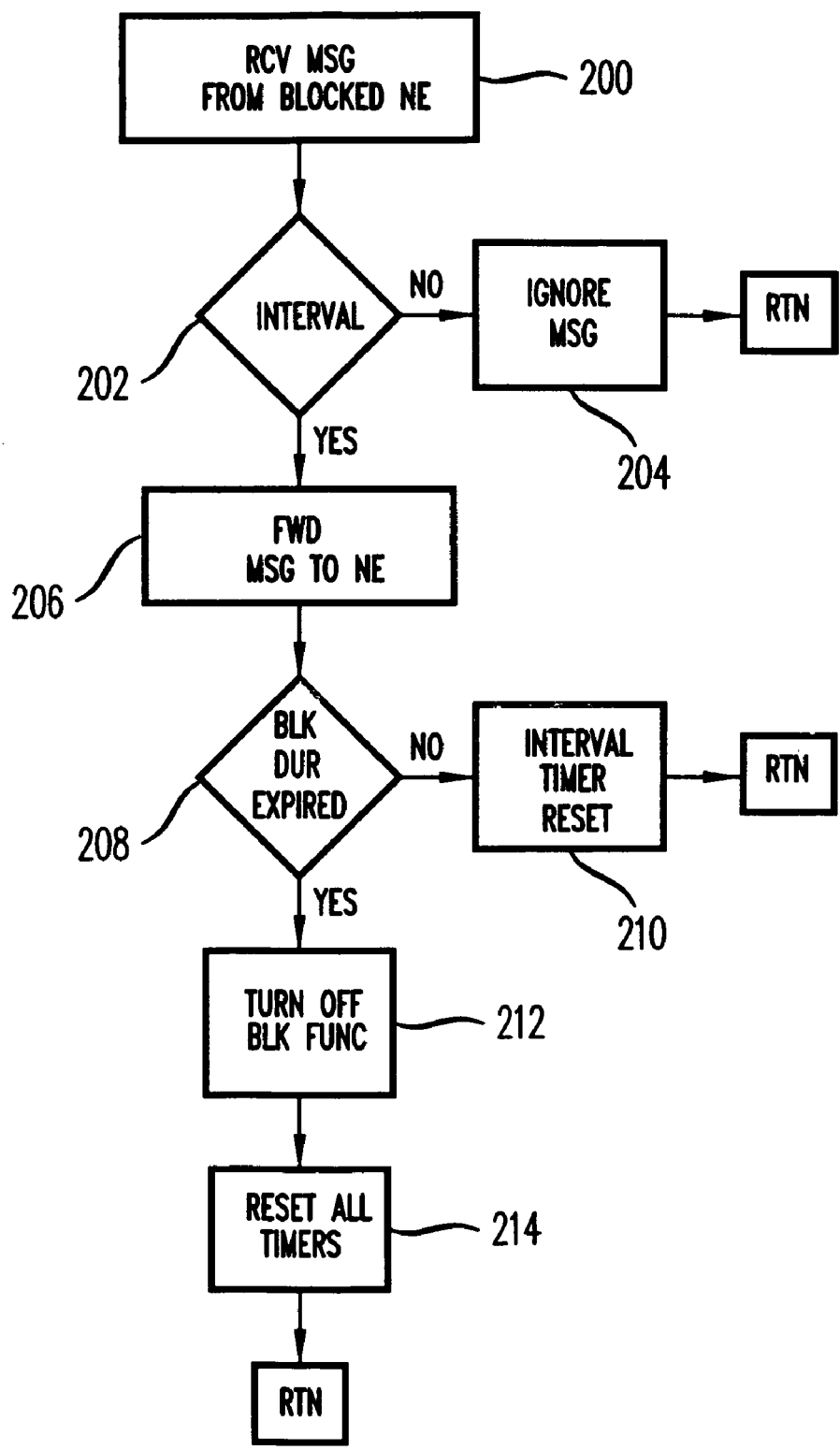
FIG. 8 illustrates a flow diagram for an SCF that receives a message during a blockout period.

FIG. 8 illustrates the flow diagram that SCF 42 executes when it receives a message from a blocked targeted network element. In step 200, the SCF receives a requesting element addressed message from the targeted network element. In step 202, the SCF determines whether the message was received during an interval that corresponds to a period during which messages are accepted notwithstanding that a block is in effect. If it is determined in step 202, that this is not an acceptance interval, the message is ignored in step 204 and then the SCF returns to its normal processing. If in step 202 it is determined that the message was received during an acceptance interval, step 206 is executed where the message is forwarded to the network element that requested the blocking. In step 208, it is determined whether the blocking duration has expired. If the blocking duration has not expired, step 210 is executed where the interval timers are reset so that the next interval during which communications are accepted may be identified. If in step 208, it is determined that the blocking duration has expired, step 212 is executed where the blocking function is deactivated and then step 214 is executed where the blocking duration and interval timers are reset. The SCF then returns to its normal functioning.

The invention claimed is:

1. A method for controlling messages in a communication system, comprising the steps of:
   receiving a message blocking request from a first mobile switching center (MSC) at a system control function component (SCF), the message blocking request identifying a second MSC; and
   preventing messages from being communicated from the second MSC to the first MSC.

2. The method of claim 1, wherein the step of preventing is performed at the SCF.

3. The method of claim 1, further comprising the step of sending a message blocking command to the second MSC.

4. The method of claim 3, wherein the step of preventing is performed at the second MSC.

5. The method of claim 1, wherein the message blocking request specifies a duration of a blocking period.

6. The method of claim 1, wherein the message blocking request specifies at least one acceptance interval during a blocking period, the acceptance interval being a period during which at least one message may be communicated from the second MSC to the first MSC.

7. The method of claim 1, wherein the message blocking request specifies an action to be taken by the second MSC instead of communicating a message from the second MSC to the first MSC.

8. The method of claim 7, wherein the SCF may modify the action specified in the message blocking request.

9. The method of claim 7, wherein the action includes communicating the message from the second MSC to a specified alternate destination.

\* \* \* \* \*